United States Patent [19]

Doering

[11] Patent Number: 4,582,333

[45] Date of Patent: Apr. 15, 1986

[54] TOWED VEHICLE

[75] Inventor: Charles W. Doering, Louisville, Ky.

[73] Assignee: Brinly-Hardy Co., Inc., Louisville, Ky.

[21] Appl. No.: 566,508

[22] Filed: Dec. 29, 1983

[51] Int. Cl.⁴ .............................................. B62D 39/00
[52] U.S. Cl. ................................. 280/63; 280/491 R; 280/656; 296/181
[58] Field of Search ...................... 280/63, 402, 491 R, 280/656, 204, 639; 296/181, 52, 184; D12/105; 298/5

[56] References Cited

U.S. PATENT DOCUMENTS 2,569,965 10/1951 Wiedman ............................ 296/181
3,731,974 5/1973 Stafford ................................ 298/5

FOREIGN PATENT DOCUMENTS 0079067 5/1983 European Pat. Off. ............. 296/181
209200 10/1959 Fed. Rep. of Germany ........ 280/63

Primary Examiner—David M. Mitchell
Assistant Examiner—Joseph G. McCarthy
Attorney, Agent, or Firm—Frank C. Leach, Jr.

[57] ABSTRACT

A cart includes a support body having two separate portions. Each of the separate portions has a bottom wall with a side wall extending upwardly from one side thereof and a flange extending downwardly from the other side thereof. The flanges of the two separate portions abut each other and are held in this position by tabs on one of the flanges being disposed within slots in the other flange. A front end wall is fixed to the two separate portions. A rear end wall is removably connected to the two separate portions. The side wall of each of the two separate portions has an axle support plate attached thereto and supporting an axle for a wheel. A torque tube extends between the two plates to prevent twisting and add rigidity to the assembled cart. A tow bar, which is connected to a vehicle for towing or pulling the cart, is attached to the bottom walls of the two separate portions and has a longitudinal slot therein to receive the abutting flanges. The tow bar also may be rotatably mounted on the torque tube extending between the axle support plates when it is desired to tilt the cart to dump the load through removing the rear end wall. The front end wall also could be removable if desired.

22 Claims, 13 Drawing Figures

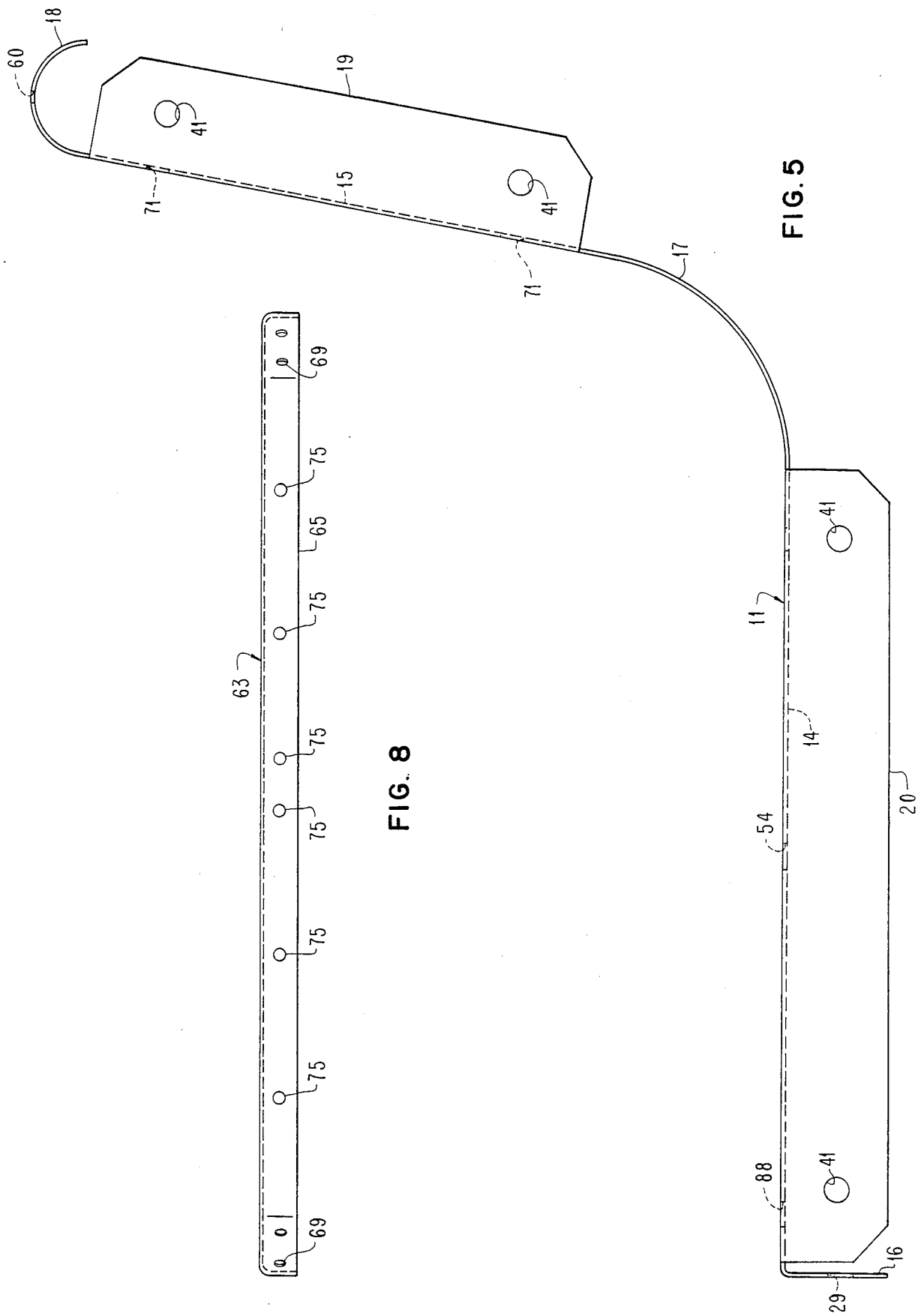

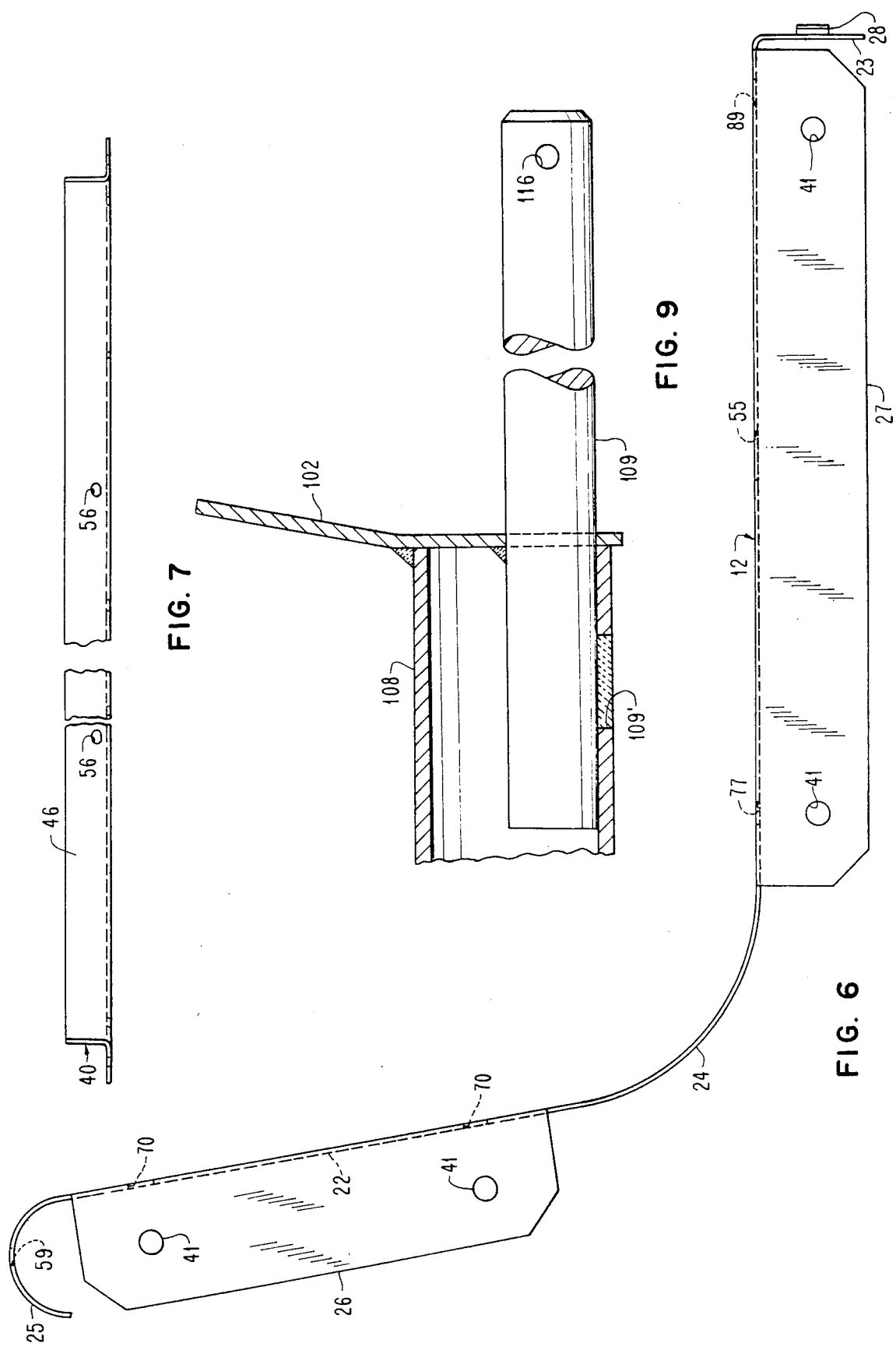

TOWED VEHICLE

This invention relates to a towed vehicle and, more particularly, to a cart that is easily assembled.

Numerous homeowners have small tractors for lawn care including use with a mower to cut the grass. These small tractors have a draw bar to which may be attached the mower or other vehicle to be pulled or towed by the tractor.

Many owners of small tractors also desire to have a cart to transport dirt, debris, or other articles. Presently available carts for providing such transport are shipped in an assembled condition. This requires a relatively large shipping container since the container must be larger than the cart to enable the cart to be disposed therein. This creates a relatively large shipping cost since shipping costs are based not only on weight but also on volume. This large shipping container also necessitates the same amount of space for storage in a warehouse of a distributor, for example. Each of these contributes to the cost of a cart being relatively high so that many persons do not purchase a cart even though they already have a tractor available to tow or pull the cart.

The presently available carts are usually formed by welding the various portions of the cart to each other. This also contributes to the relatively high cost of presently available carts.

The cart of the present invention overcomes the foregoing problems through providing a cart capable of being shipped in a container substantially smaller than the shipping container for presently available carts. The volume of the shipping container for the cart of the present invention is approximately one-half that of the shipping container for presently available carts of the same volumetric size.

The cart of the present invention also substantially decreases the amount of welding required in forming the cart although some welding is still performed. The cart of the present invention does not require any welding when forming the various walls of the cart. The only welding of the cart of the present invention is in forming the axle support arrangement for the wheels.

The cart of the present invention accomplishes the foregoing through forming the cart of a plurality of separate elements that may be easily assembled by the ultimate user. Accordingly, the cart of the present invention is shipped in a disassembled relation so that the volume of the shipping container is significantly reduced. No welding is required to connect the various elements, which are assembled by the ultimate user, to each other.

An object of this invention is to provide a cart capable of being assembled by the ultimate user.

Another object of this invention is to provide a cart requiring a relative small shipping container in comparison to its assembled size.

A further object of this invention is to provide a relatively low cost cart.

Other objects of this invention will be readily perceived from the following description, claims, and drawings.

This invention relates to a cart including a support body comprising two separate portions. Each of the two separate portions includes a bottom wall, a side wall extending upwardly from one side of the bottom wall, and a flange extending downwardly from the other side of the bottom wall with the flanges of the two separate portions abutting each other and having means cooperating with each other to hold the flanges in abutting relation so that the bottom walls of the two separate portions form a substantially continuous bottom wall. A front end wall, which is supported by the two separate portions, is connected to each of the two separate portions by connecting means. A removable rear end wall is removably connected to each of the two separate portions by removable connecting means. Axle support means, which are attached to the side wall of each of the two separate portions, support axle means, which extend outwardly from each of the axle support means. Each of the axle means has a wheel rotatably supported thereon exterior of the axle support means with means extending between the axle support means to prevent twisting of the two separate portions. Towing means is connected to one of the extending means and the two separate portions to enable towing of the cart.

In the drawings:

FIG. 5 is a rear end elevational view of one of the two portions forming a support body of the cart of FIG. 1;

FIG. 6 is a rear end elevational view of the other of the two portions forming the support body of the cart of FIG. 1;

FIG. 7 is a fragmentary top plan view of a rear angle support of the cart of FIG. 1;

FIG. 8 is a bottom plan view of a front wall of the cart of FIG. 1;

FIG. 9 is a fragmentary elevational view, partly in section, of a portion of an axle support arrangement of the cart of FIG. 1;

Figure 1:
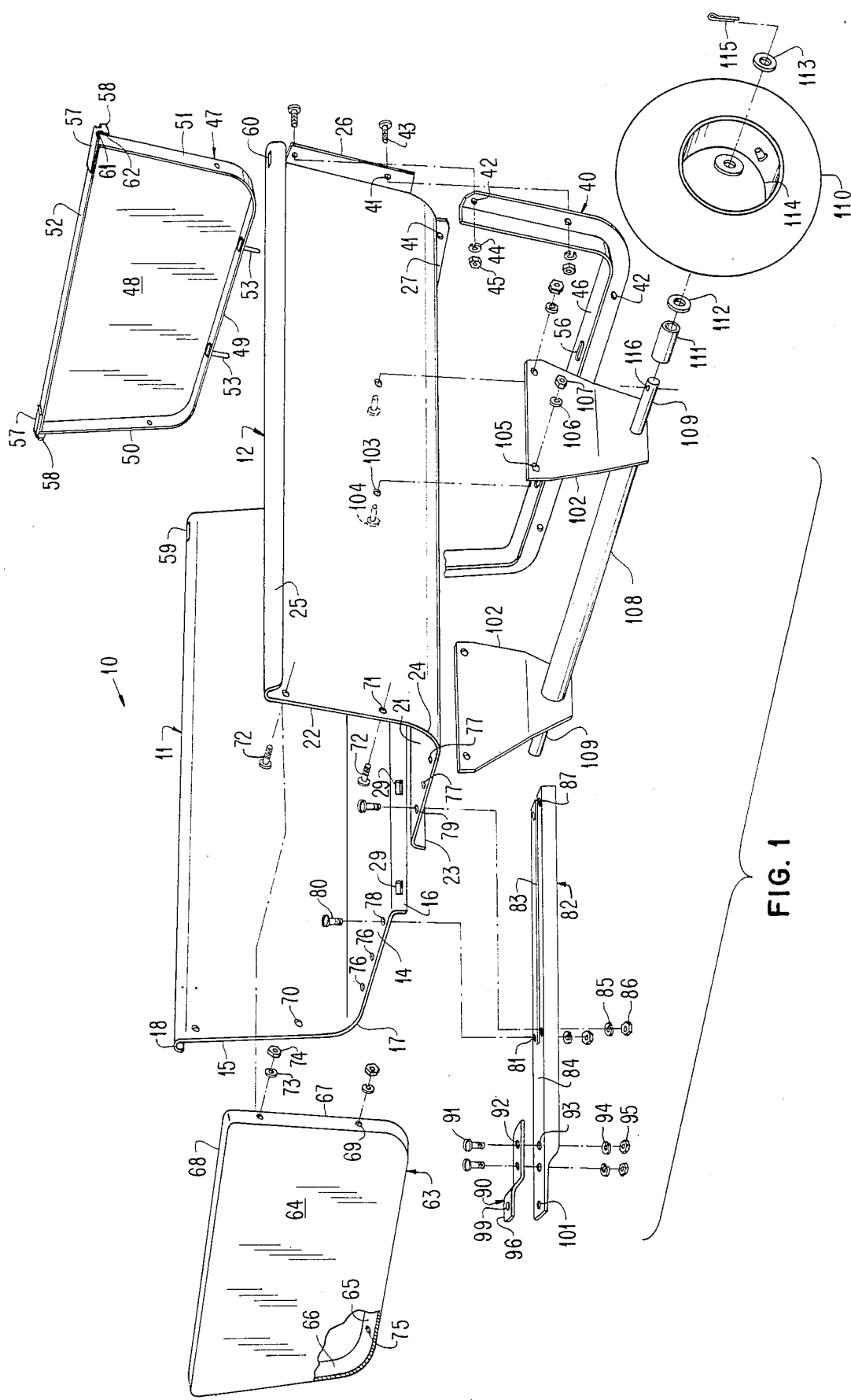
FIG. 1 is an exploded perspective view of the cart of the present invention.

Referring to the drawings and particularly FIG. 1, there is shown a cart 10. The cart 10 includes a portion 11 and a portion 12 forming a support body 13 (see FIGS. 2–4) of the cart 10 when the portions 11 and 12 are secured to each other.

Figure 4:
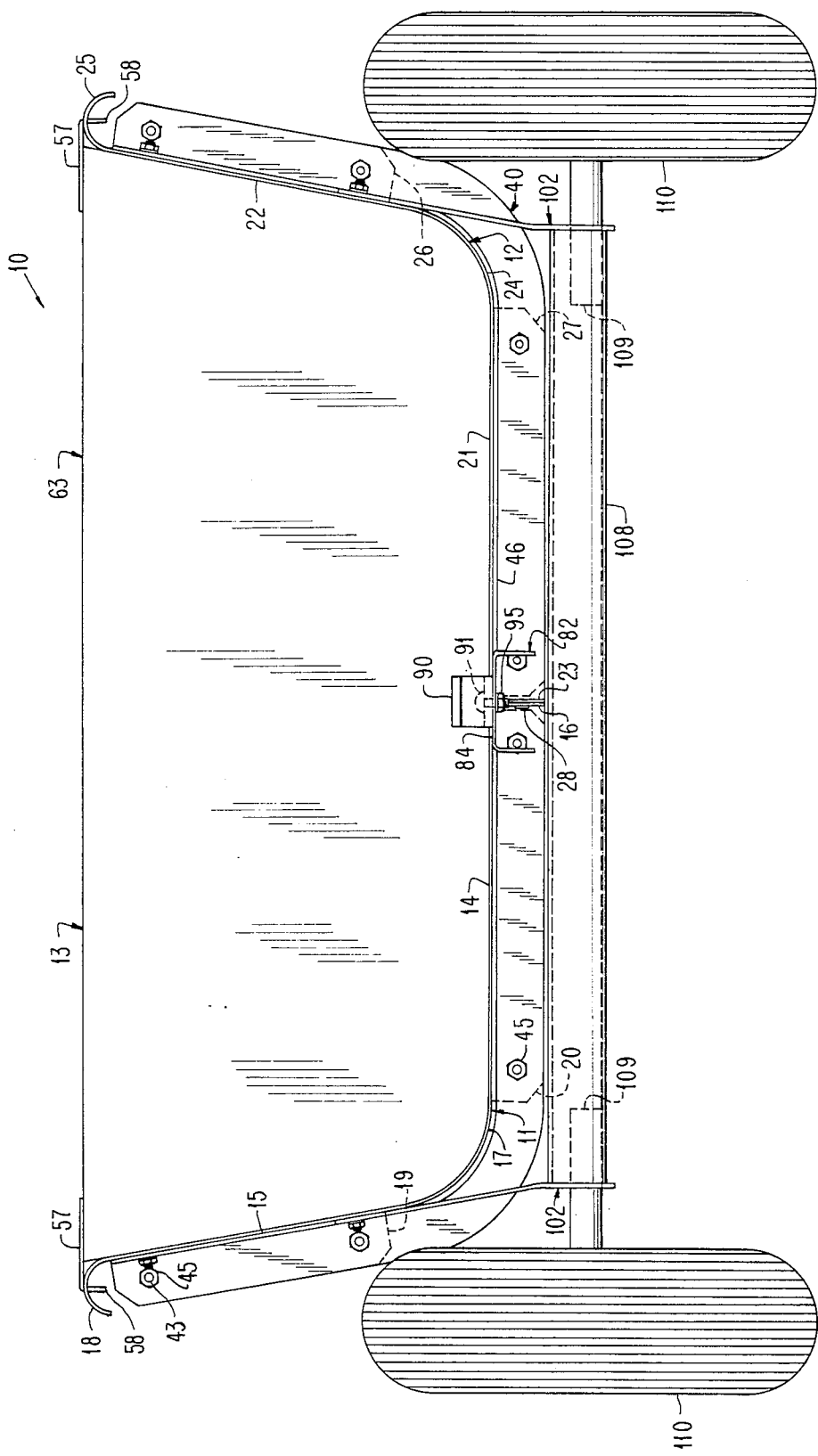
FIG. 4 is a front elevational view of the cart of FIG. 1.

The portion 11 includes a bottom wall 14 (see FIG. 1), a side wall 15 extending upwardly from one side of the bottom wall 14, and a flange 16 extending downwardly from the other side of the bottom wall 14 and substantially perpendicular to the bottom wall 14. The bottom wall 14 merges into the side wall 15 through a curved segment 17 so that the side wall 15 extends outwardly as it extends upwardly. The side wall 15, which is preferably inclined about 10° to the vertical as can be seen in FIGS. 4 and 5, has its upper end terminate in a curved portion 18.

The portion 11 has a first rear flange 19 extending outwardly from the outer surface of the side wall 15 adjacent its rear end and substantially perpendicular thereto. A second rear flange 20 extends downwardly from the bottom wall 14 of the portion 11 and is disposed in the same vertical plane as the first rear flange 19. The second rear flange 20 is disposed substantially perpendicular to the bottom wall 14 and the flange 16.

The portion 12 (see FIG. 1) of the cart 10 includes a bottom wall 21 having a side wall 22 extending upwardly from one side thereof and a flange 23 extending downwardly from the other side of the bottom wall 21 and substantially perpendicular to the bottom wall 21. The bottom wall 21 merges into the side wall 22 by a curved segment 24 so that the side wall 22 inclines outwardly as it extends upwardly away from the bottom wall 21 of the portion 12. The side wall 22, which is preferably inclined 10° to the vertical as can be seen in FIGS. 4 and 6, has its upper end terminate in a curved top portion 25.

The side wall 22 has a first rear flange 26 extending outwardly from its outer surface adjacent its rear end and substantially perpendicular thereto. The bottom wall 21 of the portion 12 of the cart 10 has a second rear flange 27 extending downwardly therefrom. The second rear flange 27, which is in the same vertical plane as the first rear flange 26, is disposed substantially perpendicular to the bottom wall 21 and the flange 23.

The flange 23 of the portion 12 has tabs 28 (see FIG. 6) formed at spaced longitudinal portions thereof. Each of the tabs 28 is positioned to cooperate with a slot 29 (see FIG. 1) in the flange 16 of the portion 11. Thus, when the flanges 16 and 23 are placed in abutting relation with each other, the tabs 28 (see FIG. 6) can enter the slots 29 (see FIG. 1) in the flange 16 of the portion 11 to attach the portions 11 and 12 to each other and hold the flanges 16 and 23 in abutting relation so that the bottom walls 14 and 21 form a substantially continuous bottom wall of the support body 13 (see FIG. 3). This attachment of the portions 11 and 12 to each other forms the support body 13 of the cart 10.

The rear ends of the portions 11 and 12 also are held together by a rear angle support 40 (see FIG. 1) being secured to the rear flanges 19 (see FIG. 5) and 20 of the portion 11 and the rear flanges 26 (see FIG. 6) and 27 of the portion 12. Each of the rear flanges 19 (see FIG. 5), 20, 26 (see FIG. 6), and 27 has a pair of circular shaped openings 41 therein and with which circular shaped openings 42 (see FIG. 1) in the rear angle support 40 are aligned. Screws 43 extend through the aligned openings 41 and 42 and cooperate with lock washers 44 and nuts 45 to attach the rear angle support 40 to each of the portions 11 and 12.

The rear angle support 40 includes a flange 46, which bears against the outer surface of each of the portions 11 and 12. Thus, the rear of the portions 11 and 12 are held in fixed relation to each other after the tabs 28 (see FIG. 6) on the flange 23 have been inserted into the slots 29 (see FIG. 1) in the flange 16. The rear angle support 40 is utilized to aid in holding the portions 11 and 12 together at the rear end because a rear wall 47 is removable from its position at the rear of the cart 10 to enable unloading of the material within the cart 10.

The rear wall 47 includes a flat panel portion 48 having a bottom flange 49, side flanges 50 and 51, and a top flange 52. The flanges 49-52 extend inwardly from the flat panel portion 48.

The bottom flange 49 rests on the inner surface of the bottom wall 14 of the portion 11 and the inner surface of the bottom wall 21 of the portion 12 when the rear wall 47 has a pair of pins 53, which project downwardly from the bottom flange 49, inserted in a slot 54 (see FIG. 5) in the bottom wall 14 of the portion 11 adjacent its rear end, a slot 55 (see FIG. 6) in the bottom wall 21 of the portion 12 adjacent its rear end, and slots 56 (see FIG. 7) in the flange 46 of the rear angle support 40 aligned with the slot 54 (see FIG. 5) and the slot 55 (see FIG. 6). When the pins 53 (see FIG. 1) are so disposed, the side flange 50 of the rear wall 47 rests against the inner surface of the side wall 15 of the portion 11 and the side flange 51 of the rear wall 47 rests against the inner surface of the side wall 22 of the portion 12.

The top flange 52 of the rear wall 47 has a bracket 57 welded to each end and formed with a tab 58 at its outer end. When the pins 53 are positioned within the slots 54 (see FIG. 5), 55 (see FIG. 6), and 56 (see FIG. 7), one of the tabs 58 (see FIG. 1) is inserted within a slot 59 in the curved top portion 18 of the side wall 15 of the portion 11 and the other of the tabs 58 is inserted within a slot 60 in the curved top portion 25 of the side wall 22 of the portion 12.

Figure 2:
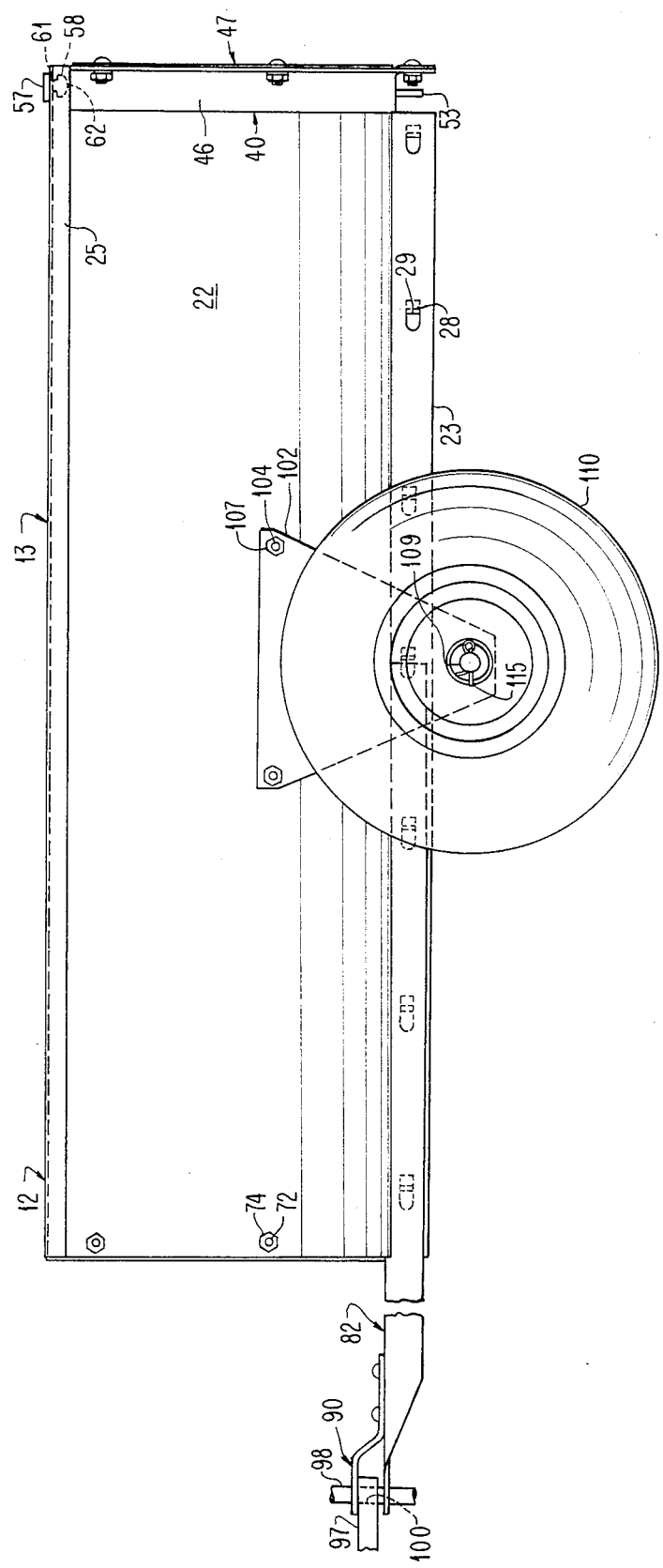
FIG. 2 is a side elevational view of the cart of FIG. 1 in its assembled relation and showing the cart connected to a draw bar of a tractor.
Figure 3:
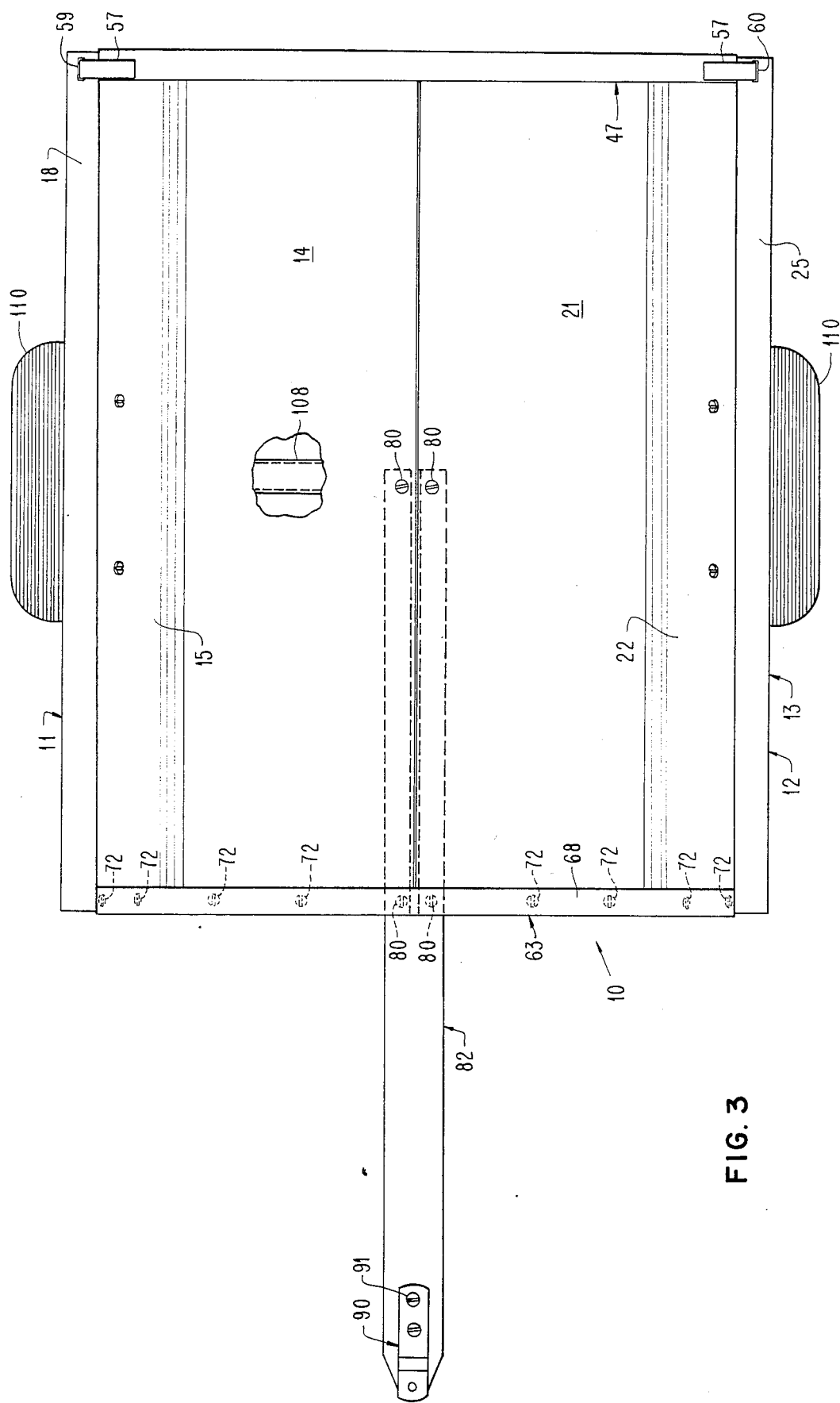
FIG. 3 is a top plan view of the cart of FIG. 1 without its connection to the draw bar of the tractor.

As shown in FIG. 2, each of the tabs 58 includes a reduced portion 61 extending downwardly from the horizontal portion of the bracket 57 and an enlarged portion 62 beneath the reduced portion 61. This prevents the tab 58 from jumping out of the slot 59 (see FIG. 1) or 60 when the cart 10 is loaded because there will be some slight shifting of the rear wall 47 when the cart 10 is loaded so that the enlarged portion 62 of each of the tabs 58 will abut an edge of each of the slots 59 and 60.

A front wall 63 cooperates with the portions 11 and 12 to close the front end of the cart 10 and to aid in holding the portions 11 and 12 together at the front end thereof. The front wall 63 includes a flat panel portion 64 having a bottom flange 65, side flanges 66 and 67, and a top flange 68. The flanges 65-68 extend inwardly from the flat panel portion 64.

The bottom flange 65 rests against the bottom wall 14 of the portion 11 and the bottom wall 21 of the portion 12. The side flange 66 of the front wall 63 rests against the inner surface of the side wall 15 of the portion 11 and the side flange 67 of the front wall 63 rests against the inner surface of the side wall 22 of the portion 12.

Each of the side flanges 66 and 67 has circular shaped openings 69 therein for alignment with circular shaped openings 70 in the side wall 15 of the portion 11 and circular shaped openings 71 in the side wall 22 of the portion 12. Screws 72 extend through each of the openings 69, 70, and 71 to attach the front wall 63 to the side wall 15 of the portion 11 and the side wall 22 of the portion 12. Lock washers 73 and nuts 74 are mounted on the screws 72 to retain the front wall 63 attached to the side wall 15 of the portion 11 and the side wall 22 of the portion 12.

The bottom flange 65 of the front wall 63 has six circular shaped openings 75 (see FIG. 8) therein. One of the outer two of the openings 75 and one of the two intermediate openings 75 cooperate with a pair of circular shaped openings 76 (see FIG. 1) in the bottom wall 14 of the portion 11, and the other of the outer two of the openings 75 (see FIG. 8) and the other of the intermediate two of the openings 75 cooperate with a pair of circular shaped openings 77 (see FIG. 1) in the bottom wall 21 of the portion 12. Additional of the screws 72 extend through the openings 76 and 77 and the aligned openings 75 and cooperate with the lock washers 73 and the nuts 74 to further connect the front wall 63 to the portions 11 and 12.

The innermost two of the openings 75 (see FIG. 8) in the bottom flange 65 of the front wall 63 are aligned with a circular shaped opening 78 (see FIG. 1) in the bottom wall 14 of the portion 11 and a circular shaped opening 79 in the bottom wall 21 of the portion 12 to receive screws 80, which also extend through a pair of circular shaped openings 81 in a tow bar 82. The tow bar 82 has a longitudinal slot 83 in its upper flat surface 84 to enable the flanges 16 and 23, which are abutting and attached to each other, to extend through the slot 83. Each of the screws 80 has a lock washer 85 and a nut 86 cooperating therewith to retain the tow bar 82 so that the upper flat surface 84 of the tow bar 82 abuts the outer surface of the bottom wall 14 of the portion 11 and the outer surface of the bottom wall 21 of the portion 12.

The tow bar 82 has a second set of circular shaped openings 87 in the upper flat surface 84 at its rear end for cooperation with a circular shaped opening 88 (see FIG. 5) in the bottom wall 14 of the portion 11 approximately midway between the front and rear ends of the bottom wall 14 and a circular shaped opening 89 (see FIG. 6) in the bottom wall 21 of the portion 12 approximately midway between the front and rear ends of the bottom wall 21. This further locks the tow bar 82 (see FIG. 3) in position through additional of the screws 80 extending through the openings 87 (see FIG. 1), 88 (see FIG. 5), and 89 (see FIG. 6).

The openings 78 (see FIG. 1) and 88 (see FIG. 5) are longitudinally aligned with each other. The openings 79 (see FIG. 1) and 89 (see FIG. 6) are longitudinally aligned with each other.

The tow bar 82 (see FIG. 1) has a clevis 90 attached to its free end by screws 91 extending through circular shaped openings 92 in the clevis 90 and circular shaped openings 93 in the tow bar 82. Lock washers 94 and nuts 95 cooperate with the screws 91 to connect the clevis 90 to the tow bar 82.

The clevis 90 has a portion 96 spaced from the tow bar 82 so that a draw bar 97 (see FIG. 2) of a pulling or towing vehicle such as a tractor, for example, can fit between the clevis 90 and the tow bar 82. A connecting pin 98 extends through a circular shaped opening 99 (see FIG. 1) of the portion 96 of the clevis 90, a circular shaped opening 100 (see FIG. 2) in the draw bar 97, and a circular shaped opening 101 (see FIG. 1) in the tow bar 82.

Each of the side wall 15 of the portion 11 and the side wall 22 of the portion 12 has an axle support plate 102 attached thereto. Each of the side walls 15 and 22 has circular shaped openings 103 to receive screws 104, which also extend through circular shaped openings 105 in each of the support plates 102. Lock washers 106 and nuts 107 cooperate with the screws 104 to attach the axle support plates 102.

The axle support plates 102 are connected to each other by a torque tube 108, which is hollow, to prevent twisting of the load supporting elements of the cart 10 due to uneven loading. An axle 109 extends from each of the axle support plates 102. As shown in FIG. 9, each of the axles 109 is welded to the torque tube 108 through openings 109' in the torque tube 108 and to one of the axle support plates 102. Each of the axles 109 rests on the bottom of the inner surface of the torque tube 108, which is substantially larger than each of the axles 109 and is welded to each of the axle support plates 102. This provides a most rigid design with minimum welding.

A wheel 110 (see FIG. 1) is rotatably mounted on each of the axles 109. A spacer 111, which is a hollow tube, and a washer 112 are mounted on the axle 109 and cooperate to enable the wheel 110 to be rotatably mounted on the axle 109 by spacing the wheel 110 from the axle support plate 102. A washer 113 is disposed on the exterior of a hub 114 of the wheel 110. A cotter pin 115 extends through a passage 116 in the axle 109 to retain the wheel 110 in position on the axle 109 with the cotter pin 115 bearing against the washer 113 rather than the hub 114 of the wheel 110.

The cart 10 is shipped in the broken down or disassembled condition with the portions 11 and 12 being the longest elements of the cart 10. Thus, the size of the shipping container for the cart 10 in its disassembled condition is relatively small.

The cart 10 is assembled by initially having the tabs 28 (see FIG. 6) on the flange 23 of the portion 12 disposed within the slots 29 (see FIG. 1) in the flange 16 of the portion 11. Then, either the front wall 63 or the rear wall 47 is attached to the portions 11 and 12. If the rear wall 47 is first attached, it is first necessary to attach the rear angle support 40 to the portions 11 and 12. Then, the rear wall 47 is removably positioned at the rear of the portions 11 and 12. With the front wall 63 being attached after the rear wall 47, the tow bar 82 is attached to the portions 11 and 12 after the front wall 63 is secured to the portions 11 and 12. The tow bar 82 preferably already has the clevis 90 attached thereto although this could be accomplished after the tow bar 82 is secured to the portions 11 and 12.

Then, the axle support plates 102 are secured to the portions 11 and 12. The wheels 110 may have been attached to the axles 109 prior to the attachment of the axle support plates 102 to the portions 11 and 12 or after such attachment.

If desired, the front wall 63 may be removably mounted in the same manner as the rear wall 47. This would enable relatively long loads to be carried by the cart 10 since loads could extend beyond both the front and rear of the cart 10. In such an arrangement, it would be necessary to utilize a front angle support similar to the rear angle support 40 and to have the portion 11 provided with flanges like the rear flanges 19 and 20 at its front end and the portion 12 provided with flanges like the rear flanges 26 and 27 at its front end. Of course, with this arrangement, the tow bar 82 would be connected solely to the bottom wall 14 of the portion 11 and the bottom wall 21 of the portion 12.

Figure 11:
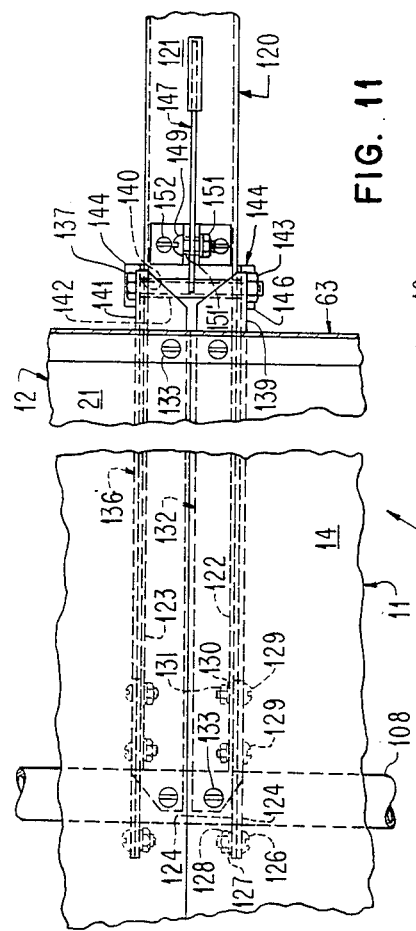
FIG. 11 is a fragmentary top plan view of the portion of the cart of FIG. 1 shown in FIG. 10.
Figure 10:
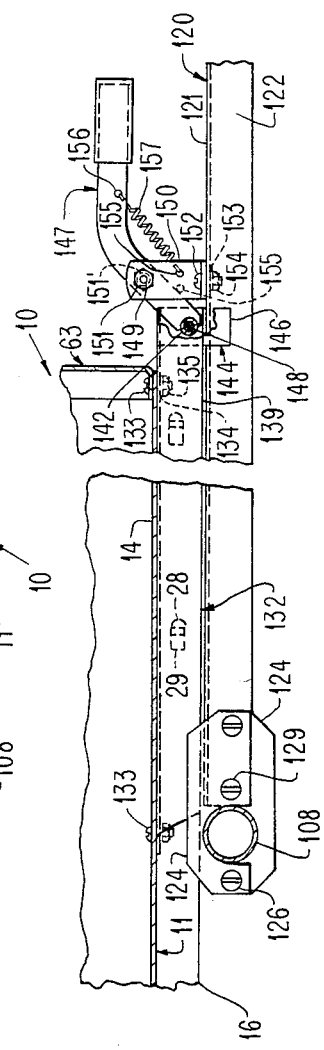
FIG. 10 is a fragmentary side elevational view of a modification of the cart of FIG. 1.

The cart 10 may be modified to enable dumping therefrom when the rear wall 47 is removed. As shown in FIGS. 10 and 11, the cart 10 has a tow bar 120 rotatably mounted on the torque tube 108. The tow bar 120 has an upper flat surface 121 with depending side flanges 122 and 123 so as to be U-shaped.

Figure 12:
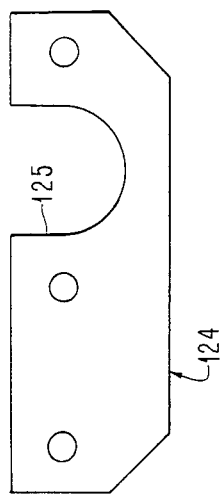
FIG. 12 is a side elevational view of a plate for attaching a tow bar to a torque tube in the cart of FIGS. 10 and 11.

Each of the side flanges 122 and 123 of the tow bar 120 has a pair of plates 124 attached to its rear end for rotatably mounting the tow bar 120 on the torque tube 108. As shown in FIG. 12, each of the plates 124 has a U-shaped recess 125 with the recesses 125 cooperating to form a circular shaped opening to receive the torque tube 108 (see FIGS. 10 and 11) so that the torque tube 108 is rotatably mounted between two of the plates 124 when the plates 124 are secured to each other. The rear ends of the two adjacent plates 124 are secured to each other by a screw 126, a lock washer 127 (see FIG. 11), and a nut 128. Each pair of the plates 124 also is attached to the rear end of one of the side flanges 122 and 123 of the tow bar 120 by screws 129, lock washers 130, and nuts 131.

This arrangement enables the tow bar 120 to be rotatably mounted on the torque tube 108. Therefore, the portions 11 and 12, which are fixed to the torque tube 108, can be rotated relative to the tow bar 120, which is fixed to the draw bar 97 (see FIG. 2) in the same manner as the tow bar 82 is connected thereto.

The bottom wall 14 (see FIG. 10) of the portion 11 of the cart 10 has an L-shaped angle 132 attached thereto by screws 133, lock washers 134, and nuts 135. The bottom wall 21 (see FIG. 11) of the portion 12 of the cart 10 has an L-shaped angle 136 attached thereto by the screws 133, the lock washers 134 (see FIG. 10), and the nuts 135 in the same manner as the angle 132 is attached to the bottom wall 14 of the portion 11.

The forward pair of the screws 133 (see FIG. 11), which secure the angles 132 and 136, respectively, to the portions and 12, respectively, of the cart 10 extend through the inner two of the circular shaped openings 75 (see FIG. 8) in the bottom flange 65 of the front wall 63, the circular shaped opening 78 (see FIG. 1) in the bottom wall 14 of the portion 11, and the circular shaped opening 79 in the bottom wall 21 of the portion 12. The rear pair of the screws 133 (see FIG. 11) extends through the circular shaped opening 88 (see FIG. 5) in the bottom wall 14 of the portion 11 and the circular shaped opening 89 (see FIG. 6) in the bottom wall 21 of the portion 12.

The front ends of the angles 132 (see FIG. 11) and 136 are secured to each other by a bolt 137 extending through an opening in a downwardly depending portion 139 of the angle 132 and an opening 140 in a downwardly depending portion 141 of the angle 136. A spacer 142, which is a hollow cylindrical tube, surrounds the bolt 137, which is retained in position by a nut 143, and extends between the inner surfaces of a pair of stabilizing straps 144.

Figure 13:
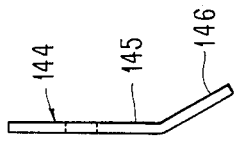
FIG. 13 is an end elevational view of a stabilizer strap used with the cart of FIGS. 10 and 11.

The bolt 137 attaches the straps 144 to the downwardly depending portion 139 of the angle 132 and the downwardly depending portion 141 of the angle 136. As shown in FIG. 13, each of the stabilizing straps 144 has a substantially vertical portion 145, which bears against the inner surface of the downwardly depending portion 139 (see FIG. 11) of the angle 132 and the inner surface of the downwardly depending portion 141 of the angle 136. The inner surfaces of the vertical portions 145 (see FIG. 13) of the straps 144 bear against the outer surfaces of the depending side flanges 122 (see FIG. 11) and 123 of the tow bar 120 when the portions 11 and 12 of the cart 10 are in their normal transport position in which the bottom walls 14 and 21 are substantially horizontal.

The strap 144 (see FIG. 13) also has a lower portion 146 extending outwardly from the vertical portion 145 at an angle of 30°. The lower portions 146 of the straps 144 function as guides when the portions 11 (see FIG. 11) and 12 of the cart 10 are returned to the normal transport position of FIG. 11 after having been raised. This becomes more important as wear of the cart 10 occurs. The straps 144 also reduce side loading stresses on the plates 124.

The bottom walls 14 and 21 of the portions 11 and 12, respectively, of the cart 10 are held in a substantially horizontal position by a lock bar 147 (see FIG. 10) having a curved or arcuate portion 148 in one end surrounding a portion of the spacer 142 and bearing thereagainst. The lock bar 147 is pivotally mounted on a bolt 149, which is supported in a pair of L-shaped brackets 150 and retained in position by a nut 151. A bushing 151' surrounds the bolt 149 as it passes through the lock bar 147 to assure free pivoting of the lock bar 147. Each of the brackets 150 is the same and is mounted on the upper flat surface 121 of the tow bar 120 by a screw 152, a lock washer 153, and a nut 154.

Each of the brackets 150 has an opening 155 in its vertical portion. The bracket opening 155 closest to an opening 156 in the lock bar 147 receives one end of a spring 157. The other end of the spring 157 is retained within the opening 156 in the lock bar 147.

The spring 157 continuously urges the lock bar 147 clockwise about the axis of the bolt 149. This holds the portion 148 of the lock bar 147 against the spacer 142 to lock the bottom walls 14 and 21 (see FIG. 11) of the portions 11 and 12, respectively, of the cart 10 in a substantially horizontal position.

When it is desired to dump the load within the portions 11 and 12 of the cart 10, the lock bar 147 (see FIG. 10) is pivoted counterclockwise about the axis of the bolt 149 against the force of the spring 157 so that the curved or arcuate portion 148 of the lock bar 147 moves away from the spacer 142 to release the spacer 142 from being retained by the lock bar 147. This enables the portions 11 and 12 (see FIG. 11) of the cart 10 to be pivoted counterclockwise (as viewed in FIG. 10) about the axis of the torque tube 108 relative to the tow bar 120. This enables dumping when the rear wall 47 (see FIG. 1) of the cart 10 is removed.

As shown in FIG. 11, each of the angles 132 and 136 has its front end beveled or cut off at an angle. This enables the lock bar 147 to cooperate with the spacer 142.

Each of the angles 132 and 136 also has its rear end beveled or cut off at an angle. This allows the angles 132 and 136 to clear the plates 124 during rotation of the portions 11 and 12 about the torque tube 108 for dumping purposes. Each of the plates 124 also is beveled or cut off at an angle at its ends to aid in this clearance.

An advantage of this invention is that it is less expensive to ship than presently available carts. Another advantage of this invention is that it significantly reduces the amount of welding to form a cart. A further advantage of this invention is that it reduces the warehouse storage space by about fifty per cent over that of presently available carts. Still another advantage of this invention is that the cart is stable on hillsides because the wheels are exterior of the support body to provide a low profile design and a lower center of gravity.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

I claim:
1. A cart including:
   a support body comprising two separate one-piece portions, said two separate portions being mirror images of each other;
   each of said two separate portions including:
   a bottom wall;

a side wall extending upwardly from one side of said bottom wall and integral with said bottom wall;

and a flange extending downwardly from the other side of said bottom wall and integral with said bottom wall;

said flanges of said two separate portions abutting each other along the center line of said cart;

said flanges of said two separate portions having means cooperating with each other to hold said flanges in abutting relation so that said bottom walls of said two separate portions form a substantially, continuous bottom wall;

a front end wall supported by said two separate portions;

connecting means to connect said front end wall to each of said two separate portions;

a removable rear end wall;

means to removably connect said removable rear end wall to each of said two separate portions;

axle support means attached to said side wall of each of said two separate portions;

axle means supported by each of said axle support means and extending outwardly from each of said axle support means;

each of said axle means having a wheel rotatably supported thereon exterior of each of said axle support means;

extending means extending between said axle support means to prevent twisting of said two separate portions, said extending means being connected only to each of said axle support means;

said extending means having its longitudinal axis in alignment with the longitudinal axis of each of said axle means and the axis of rotation of each of said wheels;

and towing means connected to one of said extending means and said two separate portions to enable towing of said cart.

2. The cart according to claim 1 in which said connecting means includes means to fixedly connect said front end wall to each of said two separate portions.

3. The cart according to claim 2 including means to secure said towing means to said bottom wall of each of said two separate portions.

4. The cart according to claim 3 in which said cooperating means includes tabs extending from said flange of one of said two separate portions and slots in said flange of the other of said two separate portions to receive said tabs.

5. The cart according to claim 2 including means to rotatably mount said towing means on said extending means for relative rotation therebetween about the center of said extending means to enable lifting of said support body relative to said towing means to raise the front of said support body above the rear of said support body.

6. The cart according to claim 5 in which said cooperating means includes tabs extending from said flange of one of said two separate portions and slots in said flange of the other of said two separate portions to receive said tabs.

7. The cart according to claim 6 including:

extension means attached to said bottom walls of said two separate portions and extending forwardly of said front end wall;

means to releasably lock said support body to said towing means;

and said releasably locking means including:

a lock bar;

means to pivotally support said lock bar on said towing means;

said lock bar having means engaging said extension means to lock said support body to said towing means when said lock bar is in its locking position;

and resilient means urging said lock bar to its locking position.

8. The cart according to claim 5 including:

extension means attached to said bottom walls of said two separate portions and extending forwardly of said front end wall;

means to releasably lock said support body to said towing means;

and said releasably locking means including:

a lock bar;

means to pivotally support said lock bar on said towing means;

said lock bar having means engaging said extension means to lock said support body to said towing means when said lock bar is in its locking position;

and resilient means urging said lock bar to its locking position.

9. The cart according to claim 1 including means to secure said towing means to said bottom wall of each of said two separate portions.

10. The cart according to claim 9 in which said cooperating means includes tabs extending from said flange of one of said two separate portions and slots in said flange of the other of said two separate portions to receive said tabs.

11. The cart according to claim 1 including means to rotatably mount said towing means on said extending means for relative rotation therebetween about the center of said extending means to enable lifting of said support body relative to said towing means to raise the front of said support body above the rear of said support body.

12. The cart according to claim 11 in which said cooperating means includes tabs extending from said flange of one of said two separate portions and slots in said flange of the other of said two separate portions to receive said tabs.

13. The cart according to claim 12 including:

extension means attached to said bottom walls of said two separate portions and extending forwardly of said front end wall;

means to releasably lock said support body to said towing means;

and said releasably locking means including:

a lock bar;

means to pivotally support said lock bar on said towing means;

said lock bar having means engaging said extension means to lock said support body to said towing means when said lock bar is in its locking position;

and resilient means urging said lock bar to its locking position.

14. The cart according to claim 11 including:

extension means attached to said bottom walls of said two separate portions and extending forwardly of said front end wall;

means to releasably lock said support body to said towing means;

and said releasably locking means including:
  a lock bar;
    means to pivotally support said lock bar on said towing means;
    said lock bar having means engaging said extension means to lock said support body to said towing means when said lock bar is in its locking position;
    and resilient means urging said lock bar to its locking position.

15. The cart according to claim 1 in which said cooperating means includes tabs extending from said flange of one of said two separate portions and slots in said flange of the other of said two separate portions to receive said tabs.

16. A cart including:
a support body comprising two separate portions;
each of said two separate portions including:
  a bottom wall;
  a side wall extending upwardly from one side of said bottom wall;
  and a first flange extending downwardly from the other side of said bottom wall;
said first flanges of said two separate portions abutting each other;
said first flange of one of said separate portions have tabs extending therefrom;
said first flange of the other of said separate portions having slots therein to receive said tabs to hold said first flanges in abutting relation so that said bottom walls of said two separate portions form a substantially continuous bottom wall;
each of said separate portions having a second flange extending outwardly from said side wall adjacent its rear and substantially perpendicular thereto and a third flange extending downwardly from said bottom wall adjacent its rear and substantially perpendicular to said bottom wall and to said first flange;
single support means;
means to connect said single support means to each of said second flange and said third flange of each of said separate portions;
a front end wall supported by said two separate portions;
connecting means to connect said front end wall to each of said two separate portions;
a removable rear end wall;
means to removably connect said removable rear end wall to each of said two separate portions;
axle support means attached to said side wall of each of said two separate portions;
axle means supported by said axle support means and extending outwardly from each of said axle support means;
said axle means having a wheel rotatably supported thereon exterior of each of said axle support means;
extending means extending between said axle support means to prevent twisting of said two separate portions;
and towing means connected to one of said extending means and said two separate portions to enable towing of said cart.

17. The cart according to claim 16 including means to secure said towing means to said bottom wall of each of said two separate portions.

18. The cart according to claim 16 including means to rotatably mount said towing means on said extending means for relative rotation therebetween to enable lifting of said support body relative to said towing means to raise the front of said support body above the rear of said support body.

19. The cart according to claim 18 including means to releasably lock said support body to said towing means.

20. The cart according to claim 16 in which said connecting means includes means to fixedly connect said front end wall to each of said two separate portions.

21. The cart according to claim 1 in which:
said towing means includes a tow bar having longitudinal slot means therein to receive said abutting flanges of said two separate portions;
and means to secure said tow bar to said bottom wall of each of said two separate portions.

22. A cart including:
a support body comprising two separate portions;
each of said two separate portions including:
  a bottom wall;
  a side wall extending upwardly from one side of said bottom wall;
  and a first flange extending downwardly from the other side of said bottom wall;
said first flanges of said two separate portions abutting each other;
said first flanges of said two separate portions having means cooperating with each other to hold said first flanges in abutting relation so that said bottom walls of said two separate portions form a substantially continuous bottom wall;
each of said separate portions having a second flange extending outwardly from said side wall adjacent its rear and substantially perpendicular thereto and a third flange extending downwardly from said bottom wall adjacent its rear and substantially perpendicular to said bottom wall and to said first flange;
single support means;
means to connect said single support means to each of said second flange and said third flange of each of said separate portions;
a front end wall supported by said two separate portions;
connecting means to connect said front end wall to each of said two separate portions;
a removable rear end wall;
means to removably connect said removable rear end wall to each of said two separate portions;
axle support means attached to said side wall of each of said two separate portions;
axle means supported by said axle support means and extending outwardly from each of said axle support means;
said axle means having a wheel rotatably supported thereon exterior of each of said axle support means;
extending means extending between said axle support means to prevent twisting of said two separate portions;
and towing means connected to one of said extending means and said two separate portions to enable towing of said cart.

* * * * *

UNITED STATES PATENT AND TRADEMARK OFFICE
CERTIFICATE OF CORRECTION

PATENT NO. : 4,582,333

DATED : April 15, 1986

INVENTOR(S) : Charles W. Doering

It is certified that error appears in the above-identified patent and that said Letters Patent is hereby corrected as shown below:

Column 7, line 23, after "portions" insert --- 11 ---.

Column 9, line 13, cancel the "comma (,)".

Signed and Sealed this

Twenty-ninth Day of July 1986

[SEAL]

Attest:

DONALD J. QUIGG

Attesting Officer

Commissioner of Patents and Trademarks